(12) United States Patent
Fusaro et al.

(10) Patent No.: US 9,658,621 B2
(45) Date of Patent: May 23, 2017

(54) APPARATUSES, SYSTEMS AND METHODS FOR AUTOMATICALLY TAXIING AN AIRCRAFT

(71) Applicant: HONEYWELL INTERNATIONAL INC., Morristown, NJ (US)

(72) Inventors: James Fusaro, Scottsdale, AZ (US); Steven Newell, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 119 days.

(21) Appl. No.: 14/726,048

(22) Filed: May 29, 2015

(65) Prior Publication Data
US 2016/0349752 A1 Dec. 1, 2016

(51) Int. Cl.
*G05D 1/02* (2006.01)
*B64F 1/00* (2006.01)

(52) U.S. Cl.
CPC .......... *G05D 1/0202* (2013.01); *B64F 1/002* (2013.01)

(58) Field of Classification Search
CPC .............................. G05D 1/0202; B64F 1/002
USPC .............................................................. 701/3
See application file for complete search history.

(56) References Cited

U.S. PATENT DOCUMENTS

| 8,897,930 | B2 | 11/2014 | Bayer |
| 8,924,040 | B2 | 12/2014 | Edelson |
| 2009/0105891 | A1 | 4/2009 | Jones et al. |
| 2011/0127828 | A1* | 6/2011 | Sorin ........................ B60T 1/10 303/3 |
| 2015/0129368 | A1* | 5/2015 | Cahill ................... B60T 8/1703 188/71.5 |
| 2016/0200428 | A1* | 7/2016 | Morris .................. B60T 8/1703 244/50 |

FOREIGN PATENT DOCUMENTS

WO WO 2015/025131 A1 * 2/2015

* cited by examiner

*Primary Examiner* — Anne M Antonucci
(74) *Attorney, Agent, or Firm* — Shimokaji IP

(57) ABSTRACT

Apparatuses, systems and methods are provided for automatically pushing aircraft back from an airport gate and/or for automatically taxiing an aircraft. At least one engines-off drive is attached to at least one landing gear wheel to apply a rotational force and/or a rotation impeding force to the at least one landing gear wheel. At least one friction brake is attached to at least one landing gear wheel to apply a rotation impeding force to the at least one landing gear wheel.

20 Claims, 6 Drawing Sheets

APPARATUSES, SYSTEMS AND METHODS FOR AUTOMATICALLY TAXIING AN AIRCRAFT

BACKGROUND OF THE INVENTION

The present invention generally relates to apparatuses, systems and methods for automatically taxiing an aircraft.

Engines-off taxing systems are being developed to push aircraft back from airport terminal gates and to taxi aircraft around airports without using the main engines of the aircraft. Engines-off taxing systems may include an electric motor directly or indirectly attached to a respective aircraft landing gear wheel to apply rotational torque to the landing gear wheel. The electric motor may be powered by an aircraft auxiliary power unit. Thereby, use of the main aircraft engines may be minimized. Aircraft steering during pushback and/or taxi may include an input to a nose wheel steering actuation system or by applying different torque/speed input(s) to main landing gear wheels.

Use of engines-off taxing systems may eliminate the need for tugs and/or aircraft pushback vehicles. Thereby, airport ground crews may be reduced or eliminated.

Aircraft often include friction brakes (e.g., hydraulically/mechanically operated brakes and/or electro-mechanically operated brakes), attached to the aircraft landing gear wheels, to stop the aircraft. Thus, friction brake wear is problematic, and expensive.

As can be seen, there may be an ongoing need to reduce airport ground crews, to minimize main aircraft engine use, and to minimize aircraft friction brake wear.

SUMMARY OF THE INVENTION

In one aspect of the present invention, an automatic taxiing system for an aircraft includes a controller having an engines-off drive output and a friction brake output; at least one engines-off drive attached to at least one landing gear wheel of the aircraft, wherein the at least one engines-off drive is configured to apply at least one of: positive torque or negative torque to the at least one landing gear wheel, in response to the engines-off output, in non-emergency stop circumstances; and at least one friction brake attached to the at least one landing gear wheel, wherein the at least one friction brake is configured to impede rotation of the at least one landing gear wheel, in response to the friction brake output, in emergency stop circumstances.

In another aspect of the present invention, a method of automatically taxiing an aircraft includes applying torque, via at least one engines-off drive, to at least one landing gear wheel, to stop the aircraft in non-emergency stop circumstances; applying a rotation impeding force, via at least one friction brake, to the at least one landing gear wheel, to stop the aircraft in emergency stop circumstances; and preventing the torque from being applied to the at least one landing gear wheel while the rotation impeding force is being applied to the at least one landing gear wheel.

In yet another aspect of the present invention, a non-transitory computer-readable medium storing computer-readable instructions that, when executed by a processor, causes the processor to automatically taxi an aircraft, includes an aircraft taxiing route data receiving module that, when executed by a processor, causes the processor to receive aircraft taxiing route data, wherein the aircraft taxiing route data is representative of a desired aircraft taxiing route; an engines-off drive motor signal generation module that, when executed by a processor, causes the processor to generate an engines-off drive motor signal, wherein the engines-off drive motor signal is representative of a first torque to be applied to a first landing gear wheel and a second torque to be applied to a second landing gear wheel, to taxi the aircraft along the desired aircraft taxiing route; and a friction brake control signal generation module that, when executed by a processor, causes the processor to generate a friction brake control signal, wherein the friction brake control signal is representative of a rotation impeding force to be applied to at least one of: the first landing gear wheel or the second landing gear wheel, to stop the aircraft in emergency stop circumstances.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally provides apparatuses, systems, and methods for automatic aircraft pushback and/or automatically taxiing an aircraft. At least one engines-off taxiing drive may be used to stop an associated aircraft in non-emergency circumstances (e.g., normal taxiing circumstances), such that use of a friction brake may be minimized. Thereby, friction brake wear may be minimized. Use of the engines-off taxiing drive may also minimize use of main aircraft engines during aircraft taxiing.

Figure 1:
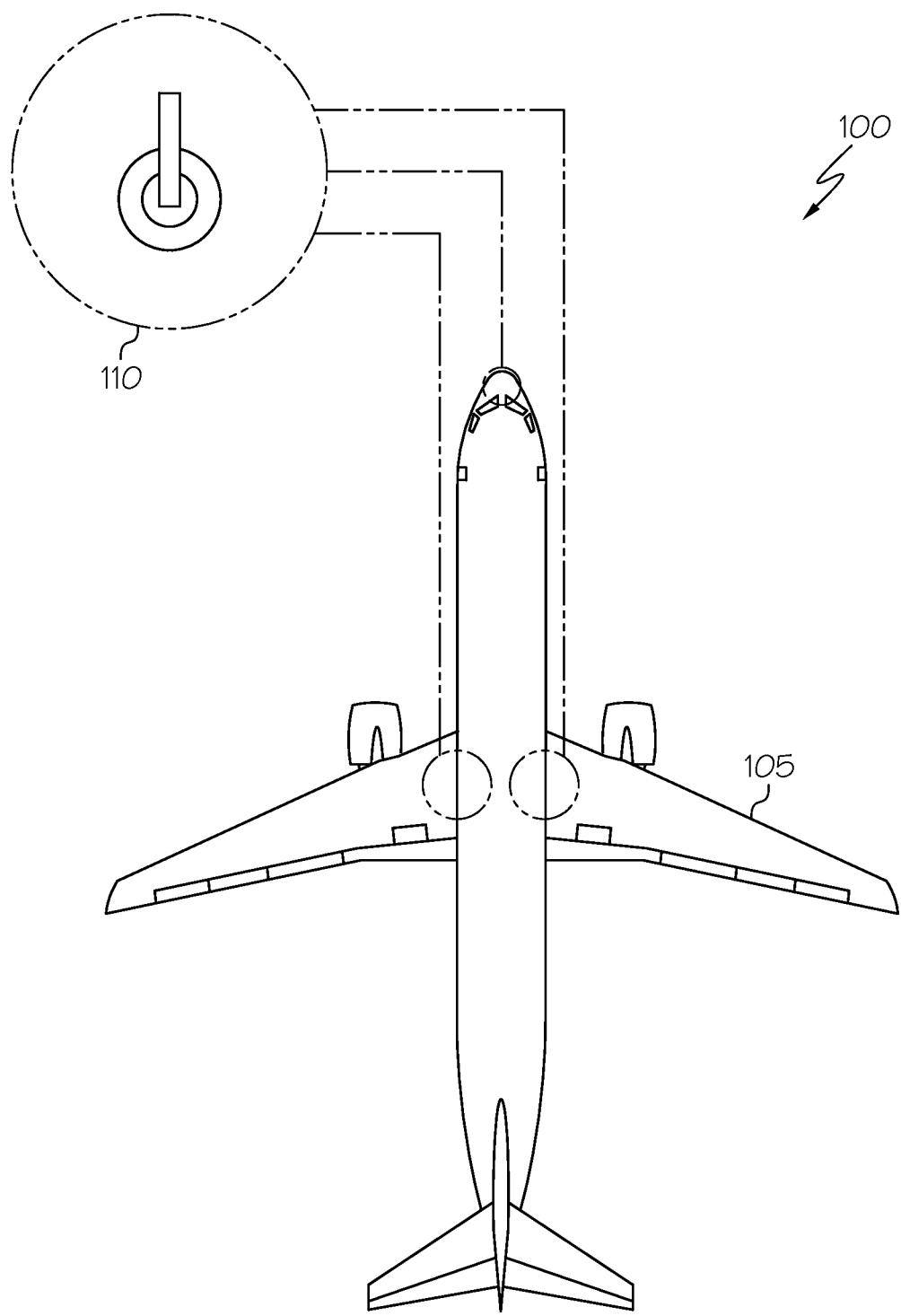
FIG. 1 depicts an aircraft according to an exemplary embodiment of the present invention.

Turning to FIG. 1, an automatic aircraft taxiing system 100 may include an aircraft 105 and at least one engines-off taxiing system 110. At least one engines-off taxiing system 110 may be attached to an aircraft nose landing gear and/or at least one main aircraft landing gear as illustrated with the dashed lines of FIG. 1. Alternatively, an engines-off taxiing system 110 may be attached to each aircraft landing gear. As described in detail herein, an engines-off taxiing system 110 may include at least one engines-off drive, at least one landing gear wheel, and at least one friction brake. An engines-off drive may be configured to apply a positive rotational torque and/or a negative rotational torque to a respective landing gear wheel to cause the landing gear wheel to rotate, or to impede the landing gear wheel from rotating. A friction brake may apply a rotation impeding force to a respective landing gear wheel. Any given friction brake may be hydraulically/mechanically operated, mechanically operated, electro-mechanically operated, or any combination thereof.

Figure 2A:
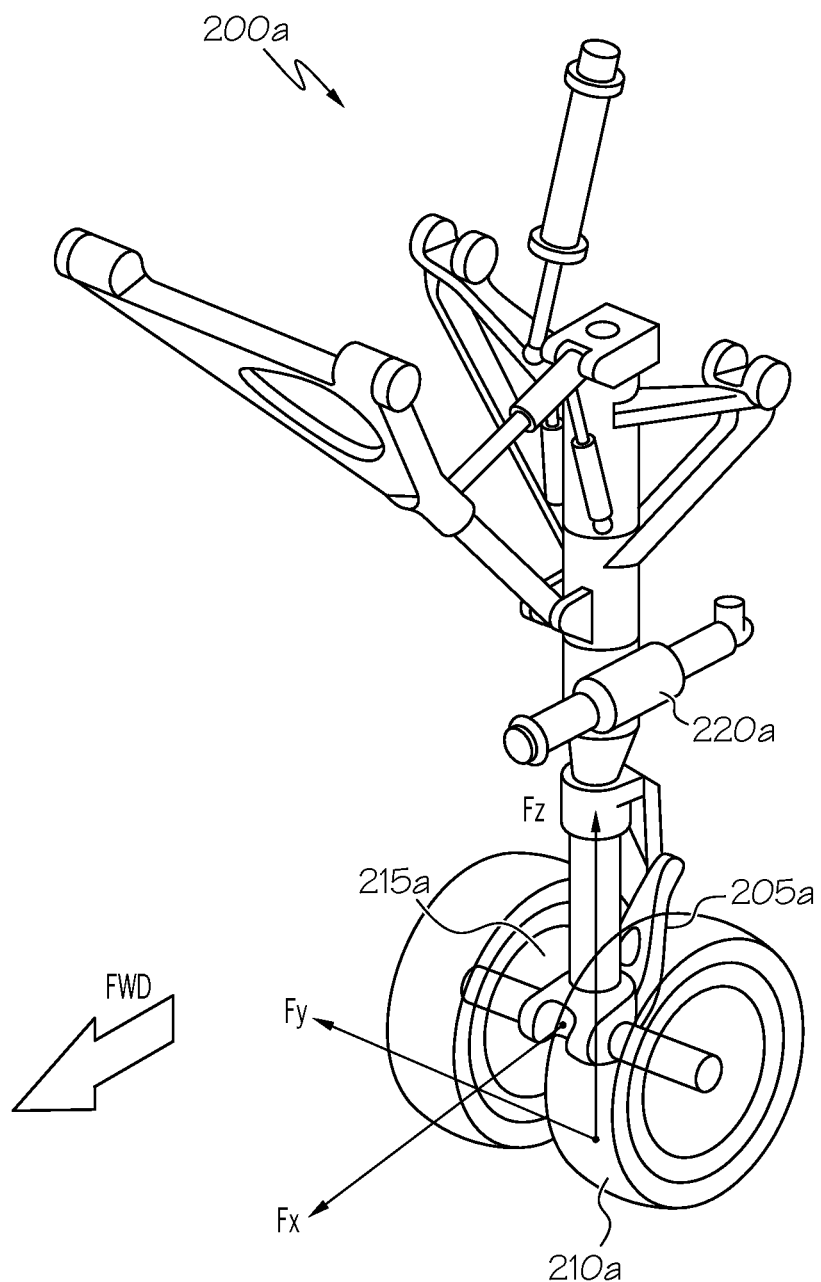
FIG. 2A depicts an aircraft nose landing gear having an engines-off drive, landing gear wheels, and friction brake according to an exemplary embodiment of the present invention.

With reference to FIG. 2A, an aircraft nose landing gear 200a may include an engines-off drive 205a, landing gear wheels 210a, and a friction brake 215a. While the aircraft nose landing gear 200a may include a friction brake 215a, it should be understood that any given aircraft nose landing gear 215a may not include a friction brake 215a. The nose landing gear 200a may be similar to, for example, the engines-off taxiing system 110 of FIG. 1. In particular, the engines-off drive 205a may be configured to apply a positive rotational torque and/or a negative rotational torque to a respective landing gear wheel 210a to cause the landing gear wheel 210b to rotate, or to impede the landing gear wheel 210b from rotating. The friction brake 215a may apply a rotation impeding force to a respective landing gear wheel 210a. An engines-off drive may include a motor controller, a motor, clutching between the motor an associated landing gear wheels, a transmission, steering actuation 220a, sensors, etc.

Figure 2B:
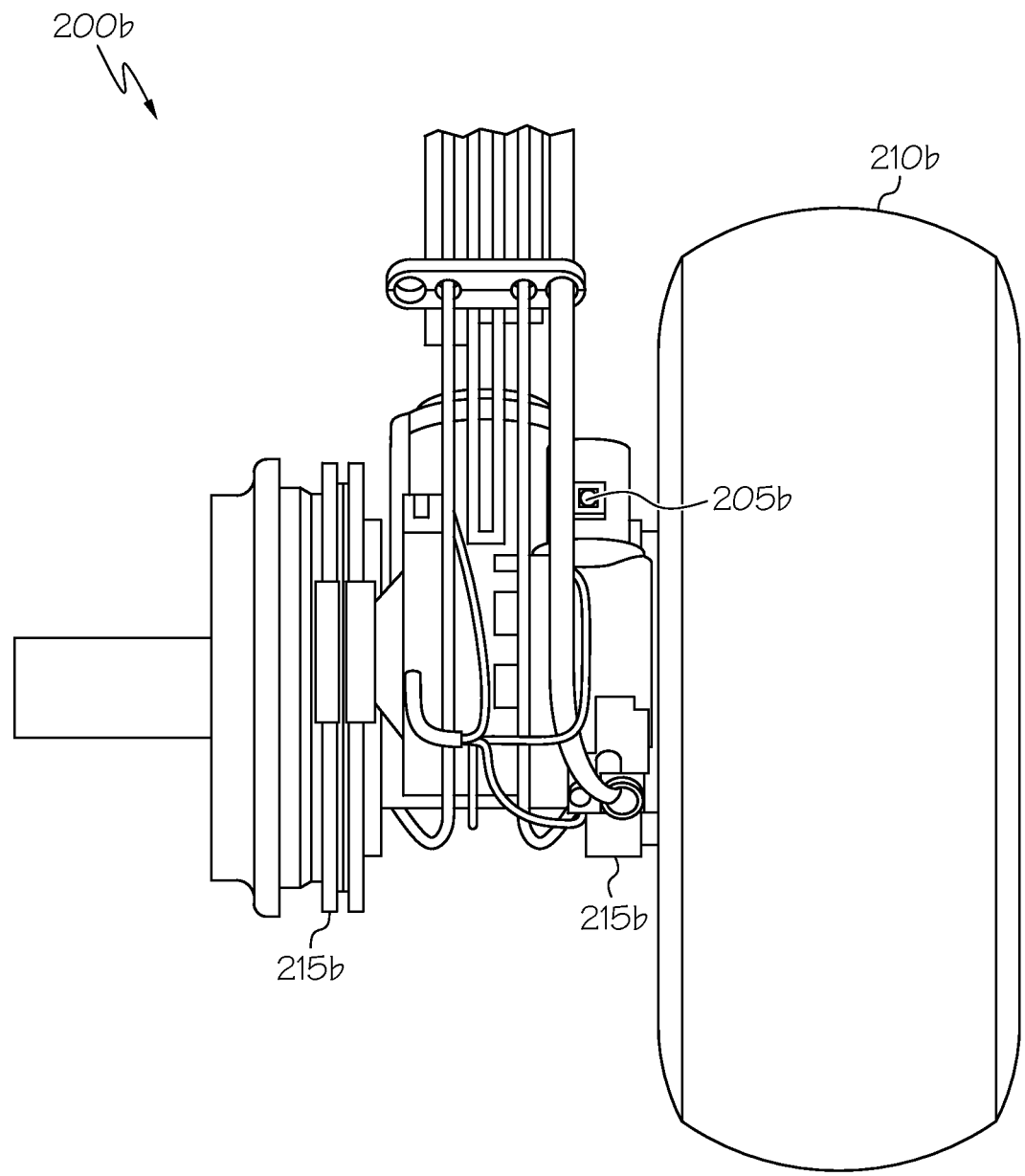
FIG. 2B depicts an aircraft main landing gear having an engines-off drive, landing gear wheels, and friction brake according to an exemplary embodiment of the present invention.

With reference to FIG. 2B, an aircraft main landing gear 200b may include an engines-off drive 205b, landing gear wheels 210b, and a friction brake 215b. The landing gear 200b may be similar to, for example, the engines-off taxiing system 110 of FIG. 1. In particular, the engines-off drive 205b may be configured to apply a positive rotational torque and/or a negative rotational torque to a respective landing gear wheel 210b to cause the landing gear wheel 210b to rotate, or to impede the landing gear wheel 210b from rotating. The friction brake 215b may apply a rotation impeding force to a respective landing gear wheel 210b. An engines-off drive may include a motor controller, a motor, clutching between the motor an associated landing gear wheels, a transmission, actuation, sensors, etc.

Figure 3:
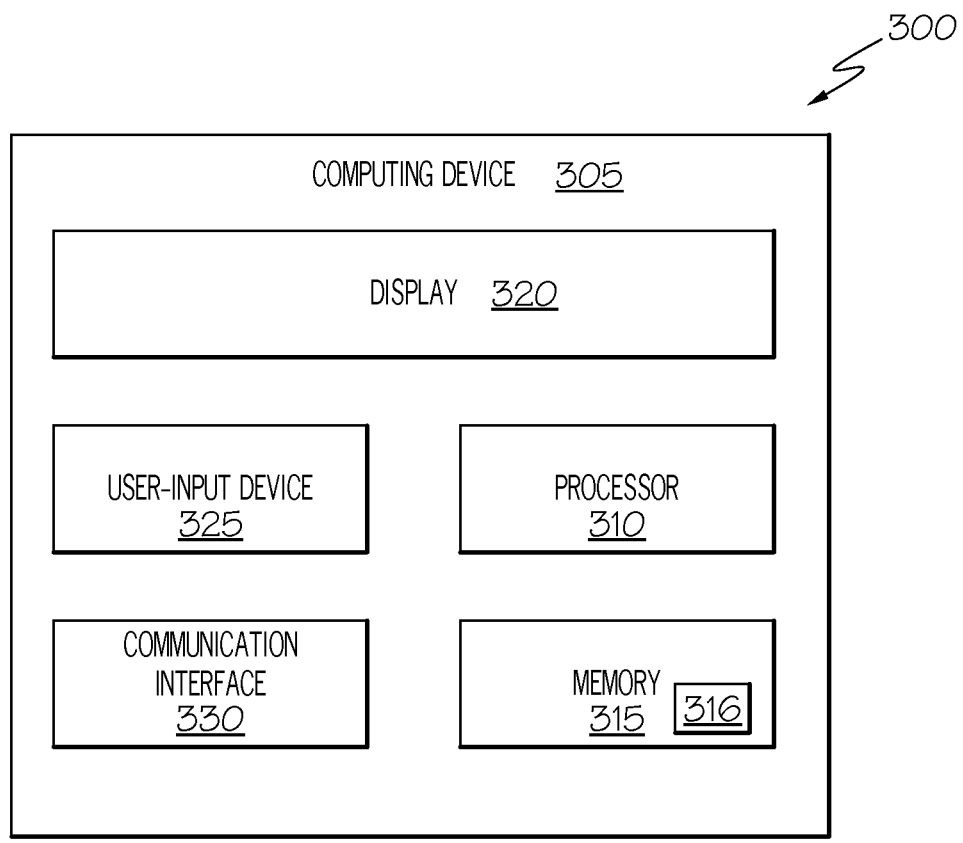
FIG. 3 depicts a block diagram of a computing device according to an exemplary embodiment of the present invention.

Turning to FIG. 3, an automatic aircraft pushback and taxiing system 300 may include a computing device 305. The computing device 305 may include a processor 310, a memory 315 (e.g., a non-transitory computer-readable memory), a user-input device (e.g., a keyboard, a mouse, etc.) 325, a display (e.g., a CRT display, a touch screen display, an LED display, an LCD display, etc.) 320, and a communication interface (e.g., a hardwired network adaptor, a wireless network adaptor, etc.) 330. The memory 315 may store a module (e.g., computer-readable instructions) 316 that, when executed by the processor 310, may cause the processor 310 to perform, for example, functions (e.g., functions as described in detail herein) associated with automatic aircraft taxiing. While only one computing device 305 is shown in FIG. 3, an automatic aircraft taxiing system may include a plurality of computing devices 305. For example, each of a plurality of aircrafts (e.g., aircraft 105 of FIG. 1) may include a respective computing device 305 and/or an airport control tower, or a central airport station, may include a computing device 305. Any given automatic aircraft pushback and taxiing system 300 may incorporate an obstacle avoidance system. For example, various sensors (e.g., image sensors, radar sensors, ultrasonic sensors, proximity sensors, etc.) may be incorporated on a given aircraft to sense obstacles proximate the aircraft. The computing device may generate aircraft steering and/or stop control signals based on outputs from these obstacle sensors.

Figure 4:
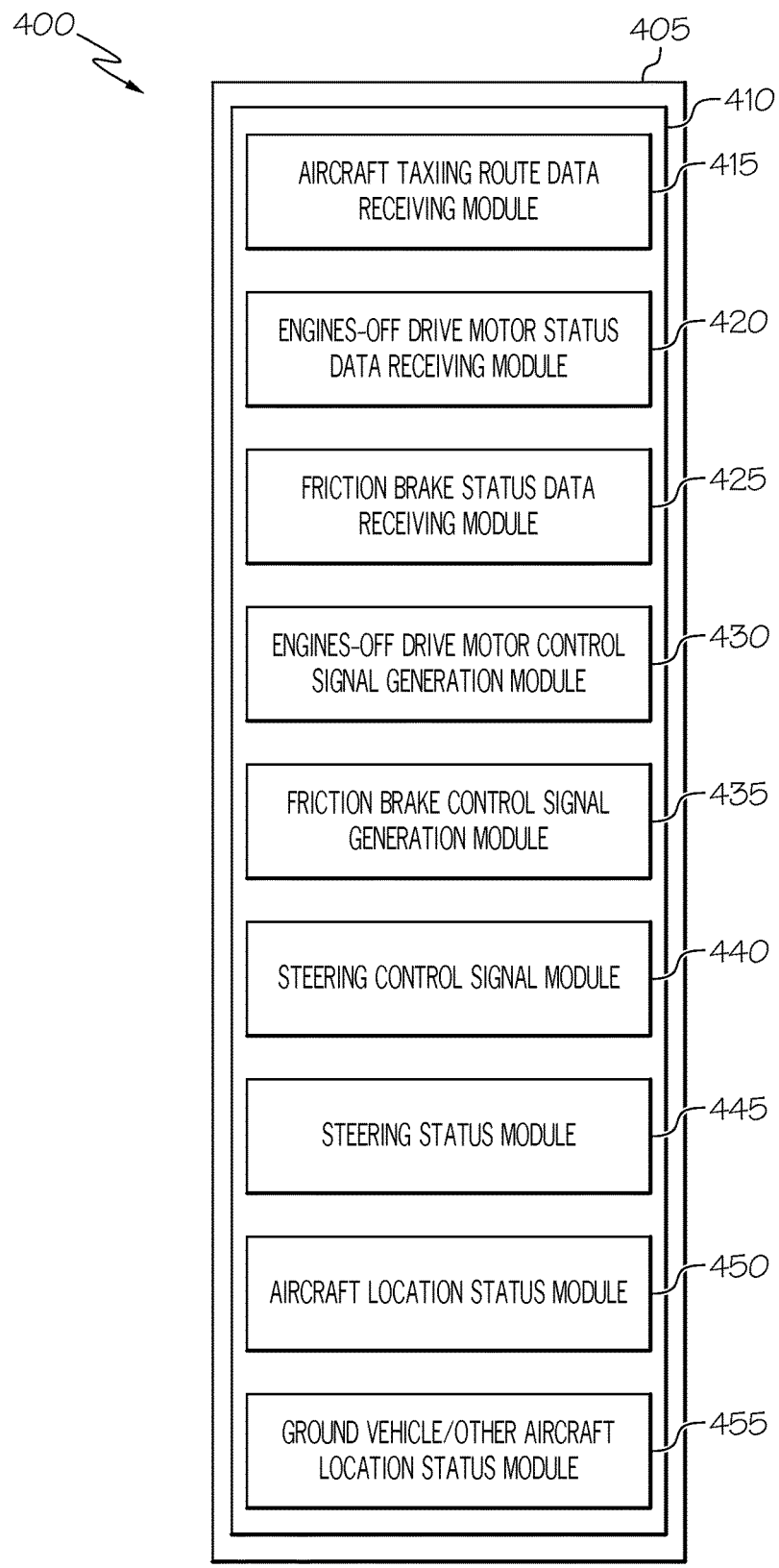
FIG. 4 depicts a block diagram of a computing device having a non-transitory computer-readable memory storing computer-readable instructions according to an exemplary embodiment of the present invention.

With reference to FIG. 4, an automatic aircraft taxiing system 400 may include a computing device 405 having non-transitory computer readable medium 410 storing an aircraft taxiing route data receiving module 415, an engines-off motor status data receiving module 420, a friction brake status data receiving module 425, an engines-off drive motor control signal generation module 430, and a friction brake control signal generation module 435 and a steering control signal module 440, steering status module 445, an aircraft location status module 450, and a ground vehicle/other aircraft location status input module 455. The modules 415-455 may be similar to, for example, module 316 of FIG. 3 and could be combined in any manner with computing device 305.

Figure 5:
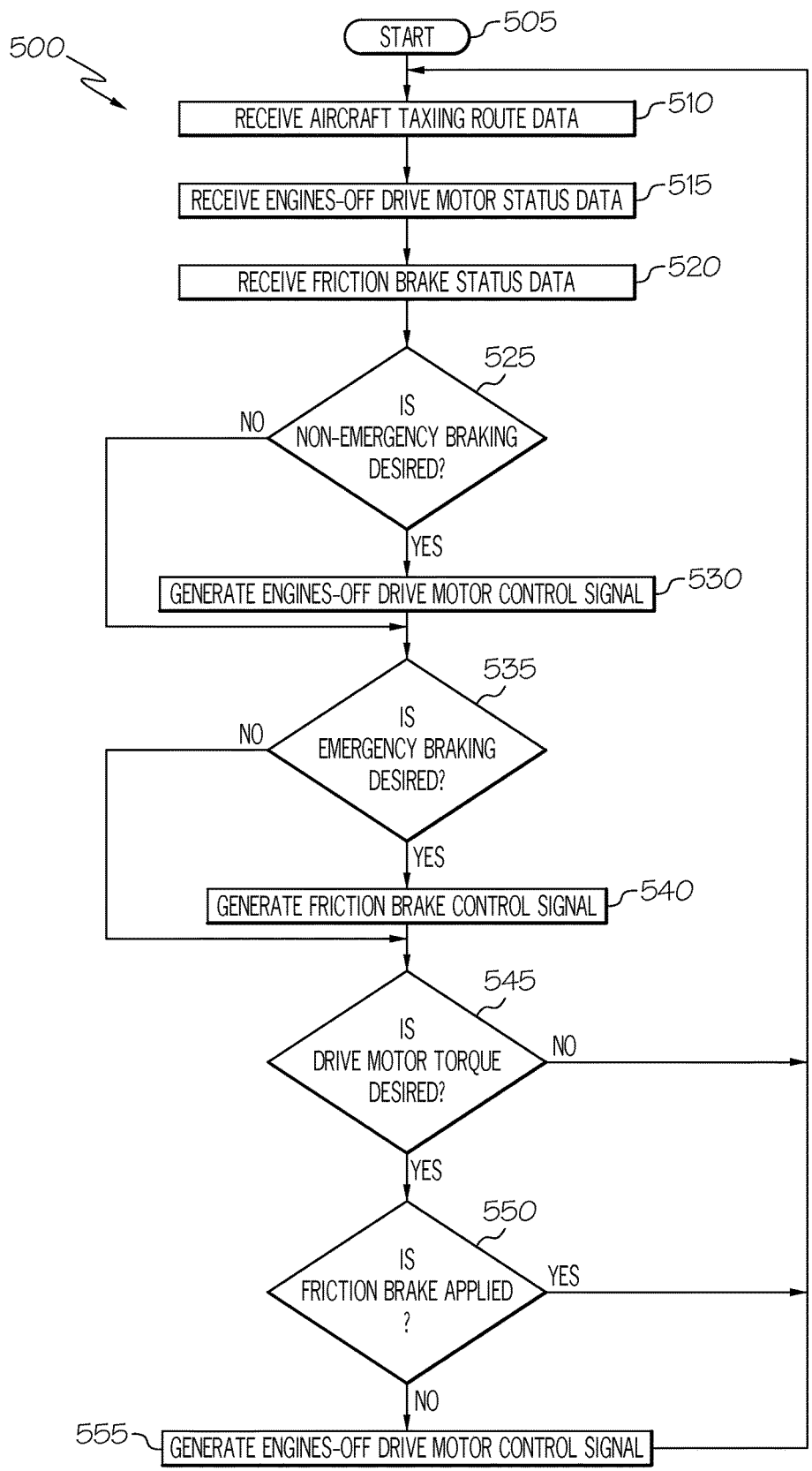
FIG. 5 depicts a flow chart of a method of automatically taxiing an aircraft according to an exemplary embodiment of the present invention.

Turning to FIG. 5, a flow chart of a method of automatically taxiing an aircraft 500 may include implementation of the modules 316, 415-455. In particular, a processor (e.g., processor 310 of FIG. 3) may start the method 500 (block 505).

The processor 310 may execute aircraft taxiing route data receiving via module 415 to cause the processor 310 to, for example, receive aircraft taxiing route data (block 510). The aircraft taxiing route data may be, for example, representative of a desired aircraft taxiing route.

The processor 310 may execute engines-off motor status data receiving via module 420 to cause the processor 310 to, for example, receive engines-off drive motor status data (block 515). The engines-off drive motor status data may be, for example, representative of a status of at least one of engines-off drive motor.

The processor 310 may execute friction brake status data receiving via module 425 to cause the processor 310 to, for example, receive friction brake status data (block 520). The friction brake status data may be, for example, representative of a status of at least one of friction brake.

The processor 310 may execute steering system status data receiving via module 445 to cause the processor 310 to, for example, receive steering system status data (block 545). The steering system status data may be, for example, representative of a status of the nose gear wheel or other steering mechanism.

The processor 310 may determine whether steering is desired (block 545). If the processor 310 determines that steering is desired, the processor 310 may execute a steering control signal module 440 to the steering system to, for example, guide the aircraft along the desired aircraft taxiing route The processor 310 may determine whether non-emergency braking is desired (block 525). If the processor 310 determines that non-emergency braking is desired (block 525), the processor 310 may execute an engines-off drive motor control signal generation module 430 to cause the processor 310 to, for example, generate an engines-off drive motor signal. The engines-off drive motor signal may be, for example, representative of a first torque to be applied to a first landing gear wheel and a second torque to be applied to a second landing gear wheel to, for example, taxi the aircraft along the desired aircraft taxiing route.

The processor 310 may determine whether emergency braking is desired (block 535). If the processor 310 determines that emergency braking is desired (block 535), the processor 310 may execute a friction brake control signal generation module 435 to cause the processor 310 to, for example, generate a friction brake control signal. The friction brake control signal may be, for example, representative of a rotation impeding force to be applied to at least one landing gear wheel to, for example, stop the aircraft in emergency stop circumstances.

The processor 310 may determine whether drive motor torque is desired (block 545) and, if the processor 310 determines that drive motor torque is desired (block 545), the processor 310 may determine if the friction brake is applied (block 550). If the processor 310 determines that the friction brake is not applied (block 550), the processor 310 may generate an engines-off drive motor signal. The engines-off drive motor signal may be, for example, representative of a first torque to be applied to a first landing gear wheel and a second torque to be applied to a second landing gear wheel to, for example, taxi the aircraft along the desired aircraft taxiing route.

An automatic taxiing system for an aircraft may include a controller having an engines-off drive output and a friction brake output. The system may further include at least one engines-off drive attached to at least one landing gear wheel of the aircraft. The at least one engines-off drive may be configured to apply at least one of: positive torque or negative torque to the at least one landing gear wheel, in response to the engines-off output, in non-emergency stop circumstances. The system may also include at least one friction brake attached to the at least one landing gear wheel. The at least one friction brake may be configured to impede rotation of the at least one landing gear wheel, in response to the friction brake output, in emergency stop circumstances.

The system may include a first engines-off drive attached to a first landing gear wheel and a second engines-off drive attached to a second landing gear wheel. An associated controller 305 may include a first engines-off drive output and a second engines-off drive output, and the first engines-off drive may apply a first torque to the first landing gear wheel in response to a first engines-off output and the second engines-off drive may apply a second torque to the second landing gear wheel in response to a second engines-off output to, for example, taxi the aircraft along a curved path.

It should be understood that, in addition to taxiing an aircraft along a curved path, the apparatuses, systems and methods of the present disclosure may be used to maintain an aircraft direction of travel along a straight path. For example, an aircraft may be taxiing along a straight path on a sloped runway, therefore, the aircraft would have a tendency to drift off course. Similarly, a side wind may have a tendency to push an aircraft off line. In any event, the apparatuses, systems and methods of the present disclosure may be used to maintain an aircraft direction of travel along a straight path. In particular, processor 310 may execute an aircraft location status module 450 to cause the processor 310 to receive aircraft location data (e.g., location data from an aircraft GPS, a LIDAR, etc.).

Furthermore, processor 310 may execute an aircraft location status module 450, a ground vehicle/other aircraft location status module 455, and an aircraft steering control signal module 440 to cause the processor to determine a location of the aircraft taxiing and to avoid obstacles (e.g., other aircraft, ground vehicles, etc.) proximate the aircraft.

The system may include a first friction brake attached to a first landing gear wheel and a second friction brake attached to a second landing gear wheel. At least one engines-off drive may be prevented from applying torque to the landing gear wheel while the friction brake is impeding rotation of the landing gear wheel. An emergency circumstance may include an impending collision of an aircraft with an obstacle or an impending collision of another aircraft with the aircraft. An engines-off drive includes at least one electric motor. Torque may be applied to at least one landing gear wheel, via at least one engines-off drive, to stop the aircraft.

A method of automatically taxiing an aircraft may include applying torque, via at least one engines-off drive, to at least one landing gear wheel, to stop the aircraft in non-emergency stop circumstances. The method may also include applying a rotation impeding force, via at least one friction brake, to the at least one landing gear wheel, to stop the aircraft in emergency stop circumstances. The method may further include preventing torque from being applied to at least one landing gear wheel while a rotation impeding force is being applied to the at least one landing gear wheel.

A method may include steering an aircraft along a path by commanding the steering system to turn the aircraft and/or applying a first torque, via a first engines-off drive, to a first landing gear wheel and applying a second torque, via a second engines-off drive, to a second landing gear wheel.

The method may further include receiving an aircraft desired taxiing route and taxiing the aircraft along a desired taxiing route by applying at least one of: a first torque to a first landing gear wheel or applying a second torque to a second landing gear wheel. The method may also include commanding the steering system to turn the aircraft and applying torque to at least one engines-off drive. The method may also include applying, via a first friction brake, a first rotation impeding force to a first landing gear wheel and applying, via a second friction brake, a second rotation impeding force to a second landing gear wheel. Torque may be generated via at least one electric motor. A first torque may be a negative torque and a second torque may be a positive torque. A first torque may be less than a second torque.

A non-transitory computer-readable medium storing computer-readable instructions that, when executed by a processor, may cause the processor to automatically taxi an aircraft, may include an aircraft taxiing route data receiving module that, when executed by a processor, causes the processor to receive aircraft taxiing route data. The aircraft taxiing route data may be representative of a desired aircraft taxiing route. The non-transitory computer-readable medium may also include an engines-off drive motor signal generation module that, when executed by a processor, may cause the processor to generate an engines-off drive motor signal. The engines-off drive motor signal may be representative of a first torque to be applied to a first landing gear wheel and a second torque to be applied to a second landing gear wheel, to taxi the aircraft along the desired aircraft taxiing route. The non-transitory computer-readable medium may further include a friction brake control signal generation module that, when executed by a processor, may cause the processor to generate a friction brake control signal. The friction brake control signal may be representative of a rotation impeding force to be applied to at least one of: the first landing gear wheel or the second landing gear wheel, to stop the aircraft in emergency stop circumstances.

The non-transitory computer-readable medium may also include an engines-off drive motor status data receiving module that, when executed by a processor, may cause the processor to receive engines-off drive motor status data. The engines-off drive motor status data is representative of a status of at least one of engines-off drive motor. Alternatively, or additionally, status of an engines-off drive motor may be derived from an associated communication interface. Same true for all status data The non-transitory computer-readable medium may further include a friction brake status data receiving module that, when executed by a processor, may cause the processor to receive friction brake status data. The friction brake status data is representative of a status of at least one of friction brake. A friction brake signal may be at least partially based on the engines-off drive motor status data.

An engines-off drive motor signal may be at least partially based on a friction brake status data. Application of at least one torque may be prevented when a rotational impeding force is applied.

It should be understood, of course, that the foregoing relates to exemplary embodiments of the invention and that modifications may be made without departing from the spirit and scope of the invention as set forth in the following claims.

We claim:

1. An automatic taxiing system for an aircraft, the system comprising:
   a computing device that determines if non-emergency braking is desired and determines if emergency braking is desired;
   a controller having an engines-off drive output and a friction brake output;
   at least one engines-off drive attached to at least one landing gear wheel of the aircraft, wherein the at least one engines-off drive is configured to apply at least one of: positive torque or negative torque to the at least one landing gear wheel, in response to the engines-off drive output, for non-emergency braking in non-emergency stop circumstances; and
   at least one friction brake attached to the at least one landing gearwheel, wherein the at least one friction brake is configured to impede rotation of the at least one landing gear wheel, in response to the friction brake output, for emergency braking in emergency stop circumstances.

2. The system of claim 1, comprising:
   a first engines-off drive attached to a first landing gear wheel; and
   a second engines-off drive attached to a second landing gear wheel, wherein the controller includes a first engines-off drive output and a second engines-off drive output, and where the first engines-off drive applies a first torque to the first landing gear wheel in response to the first engines-off output and second engines-off drive applies a second torque to the second landing gear wheel in response to the second engines-off output, to taxi the aircraft along a path.

3. The system of claim 1, comprising:
   a first friction brake attached to a first landing gear wheel; and
   a second friction brake attached to a second landing gear wheel.

4. The system of claim 1, wherein the at least one engines-off drive is prevented from applying torque to the landing gear wheel while the friction brake is impeding rotation of the landing gear wheel.

5. The system of claim 1, wherein the emergency circumstance includes at least one of: an impending collision of the aircraft with an obstacle, or an impending collision of another aircraft with the aircraft.

6. The system of claim 1, wherein the at least one engines-off drive includes at least one electric motor.

7. The system of claim 1, wherein torque is applied to the at least one landing gear wheel, via the at least one engines-off drive, to stop the aircraft.

8. A method of automatically taxiing an aircraft, the method comprising:
   determining if non-emergency braking is desired and determining if emergency braking is desired;
   applying a negative rotational torque, via at least one engines-off drive, to at least one landing gear wheel, to stop the aircraft in non-emergency stop circumstances;
   applying a rotation impeding force, via at least one friction brake, to the at least one landing gear wheel, to stop the aircraft in emergency stop circumstances; and
   preventing the negative rotational torque from being applied to the at least one landing gear wheel while the rotation impeding force is being applied to the at least one landing gear wheel.

9. The method of claim 8, further comprising:
   steering the aircraft along a path by:
      applying a first torque, via a first engines-off drive, to a first landing gear wheel; and
      applying a second torque, via a second engines-off drive, to a second landing gear wheel or combined with a steering command.

10. The method of claim 9, further comprising:
   receiving an aircraft desired taxiing route; and
   taxiing the aircraft along the desired taxiing route by applying at least one of: the first torque to the first landing gear wheel or the second torque to the second landing gear wheel or combined with a steering command.

11. The method of claim 9, wherein the first torque is a negative torque and the second torque is a positive torque, and wherein a combination of applied torques and steering commands or brake commands to steer along a path.

12. The method of claim 9, wherein the first torque is less than the second torque.

13. The method of claim 8, further comprising:
   applying, via a first friction brake, a first rotation impeding force to a first landing gear wheel; and
   applying, via a second friction brake, a second rotation impeding force to a second landing gear wheel.

14. The method of claim 8, wherein the torque is generated via at least one electric motor.

15. A non-transitory computer-readable medium storing computer-readable instructions that, when executed by a processor, causes the processor to automatically taxi an aircraft, the non-transitory computer-readable medium comprising:
   an aircraft taxiing route data receiving module that, when executed by a processor, causes the processor to receive aircraft taxiing route data, wherein the aircraft taxiing route data is representative of a desired aircraft taxiing route;
   an engines-off drive motor signal generation module that, when executed by the processor upon the processor determining that non-emergency braking is desired, causes the processor to generate an engines-off drive motor signal, wherein the engines-off drive motor signal is representative of a first torque to be applied to a first landing gear wheel and a second torque to be applied to a second landing gear wheel, to taxi the aircraft along the desired aircraft taxiing route;

a friction brake control signal generation module that, when executed by the processor upon the processor determining that emergency braking is desired, causes the processor to generate a friction brake control signal, wherein the friction brake control signal is representative of a rotation impeding force to be applied to at least one of: the first landing gear wheel or the second landing gear wheel, to stop the aircraft in emergency stop circumstances.

16. The non-transitory computer-readable medium as in claim 15, further comprising:
an engines-off drive motor status data receiving module that, when executed by a processor, causes the processor to receive engines-off motor status data, wherein the engines-off drive motor status data is representative of a status of at least one of engines-off drive motor.

17. The non-transitory computer-readable medium of claim 16, further comprising:
a friction brake status data receiving module that, when executed by a processor, causes the processor to receive friction brake status data, wherein the friction brake status data is representative of a status of at least one of friction brake.

18. The non-transitory computer-readable medium of claim 17, wherein the engines-off drive motor signal is at least partially based on the friction brake status data.

19. The non-transitory computer-readable medium of claim 18, wherein application of at least one of: the first torque or the second torque is prevented when the rotational impeding force is applied.

20. The non-transitory computer-readable medium of claim 16, wherein the friction brake signal is at least partially based on the engines-off drive motor status data.

* * * * *